United States Patent
Wang et al.

(10) Patent No.: US 6,462,508 B1
(45) Date of Patent: Oct. 8, 2002

(54) CHARGER OF A DIGITAL CAMERA WITH DATA TRANSMISSION FUNCTION

(75) Inventors: Jack Wang, Taipei Hsien (TW); Bird Tsai, Taipei Hsien (TW); Zen-Shung Chen, Taipei Hsien (TW)

(73) Assignee: Kinpo Electronics, Inc., Taipei (TW)

( * ) Notice: Subject to any disclaimer, the term of this patent is extended or adjusted under 35 U.S.C. 154(b) by 7 days.

(21) Appl. No.: 09/824,722

(22) Filed: Apr. 4, 2001

(51) Int. Cl.[7] ................................................. H02J 7/00
(52) U.S. Cl. ........................................................ 320/107
(58) Field of Search .......................... 320/107; 307/43; 348/552, 208

(56) References Cited

U.S. PATENT DOCUMENTS 6,246,211 B1 * 6/2001 Dalton et al. ................ 320/114

OTHER PUBLICATIONS

DSC–P7 Cyber–shot Digital Still camera @ www.sony-style.com.*

* cited by examiner

Primary Examiner—Gregory J. Toatley, Jr.
Assistant Examiner—Pia Tibbits
(74) Attorney, Agent, or Firm—Bacon & Thomas, PLLC

(57) ABSTRACT

A charger of a digital camera with data transmission function is disclosed. A charging circuit is provided for charging a chargeable battery of the digital camera with the transformed power via a power contact. A TV connecting port and a computer connecting port are provided for connecting to a TV and a computer. A detection circuit automatically detects if the charger is connected to the TV device or to the computer. When a data transmission key is pressed, the charger is connected to a central processing unit of the digital camera via a signal contact, and data transmission between the digital camera and the computer is executed.

6 Claims, 3 Drawing Sheets

CHARGER OF A DIGITAL CAMERA WITH DATA TRANSMISSION FUNCTION

BACKGROUND OF THE INVENTION

1. Field of the Invention

The present invention relates to a digital camera charger and, more particularly, to a charger of a digital camera with data transmission function.

2. Description of the Related Art

Current photographic technologies include various digital camera devices which capture image data by electronically scanning selected target objects. Digital camera devices typically process and compress the captured image data before storing the processed image data into internal or external memory devices. Furthermore, these digital camera devices may utilize multiple software routines running within a multi-threading environment to perform the various steps of capturing, processing, compressing and storing the image data. a new generation of cameras has become available that form images using digital technology.

After a picture-taking session, a user of the camera connects the camera to a personal computer. Alternatively, the user removes the removable storage device that contains stored images from the camera, and connects the removable storage device to the personal computer. The personal computer executes a program that can read the stored images, either from the camera or the removable storage device, and display the images on a display of the personal computer. Under software control, the personal computer can also send one or more images to a printer, store the images as files on the personal computer, and carry out other functions.

The common digital camera utilizes a special battery or a normal battery as power supply. Therefore, when the battery has not enough power to supply the digital camera, the battery needs to be recharged or replaced, which causes inconvenient operation.

For the foregoing reasons, an improved apparatus is needed for managing power conditions within a digital camera device, according to the present invention.

SUMMARY OF THE INVENTION

The object of the present invention is to provide a charger for a digital camera with an data transmission function to promote the convenience of the digital camera.

To achieve the object, the charger of the present invention includes: a power supplying device for transforming inputted AC or DC power into a predetermined voltage to supply power to the digital camera via a power contact; a charging circuit for charging a chargeable battery of the digital camera with the transformed power via the power contact; a TV connecting port for connecting to a TV; an image/sound amplifier for connecting to a digital signal processor of the digital camera via a signal contact, so as to amplify image/sound signal from the digital camera and output the amplified signal to the TV via the TV connecting port; a computer connecting port for connecting to a computer, the computer connecting port connecting to the digital signal processor of the digital camera via the signal contact, so as to input the image/sound signal from the digital camera to a computer or input instructions from the computer to the digital camera; a computer/TV connection detection circuit connected to the TV connecting port and the computer connecting port for automatically detecting whether the charger is connected to a TV or a computer, and for connecting to the digital signal processor of the digital camera via the signal contact, so as to send a detection report to the digital camera; and a data transmission key for connecting to a central processing unit of the digital camera via the signal contact, and when the data transmission key is pressed, data transmission between the digital camera and the computer or TV being executed.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
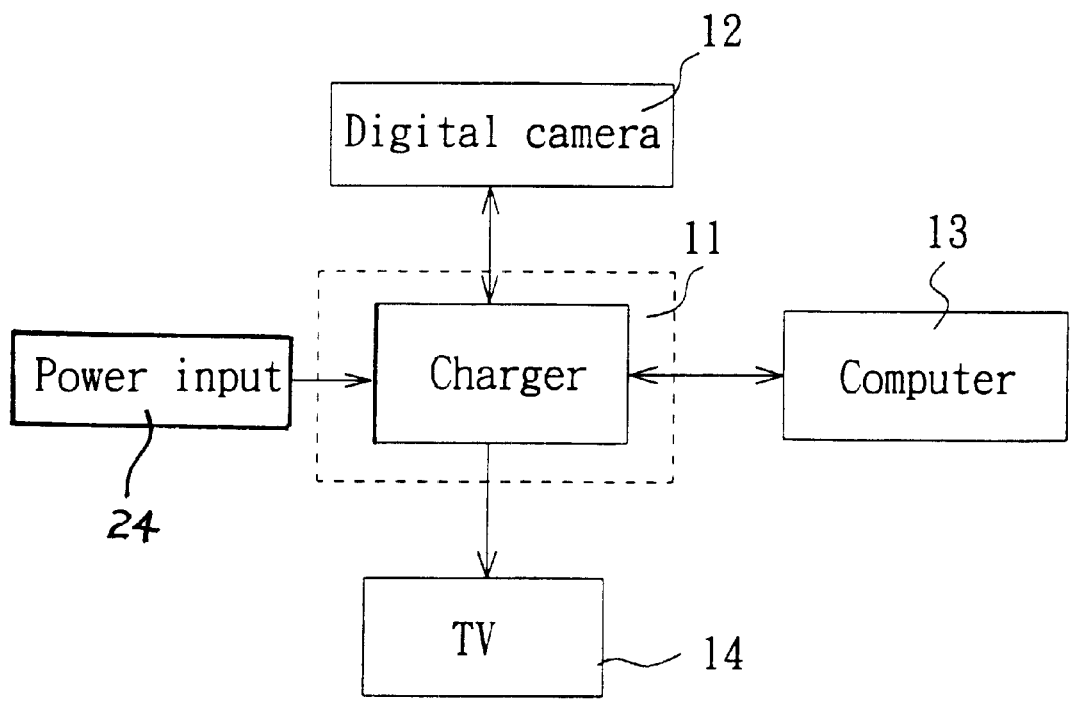
FIG. 1 is a system configuration diagram of a charger of a digital camera with data transmission function in accordance with the present invention.
Figure 2:
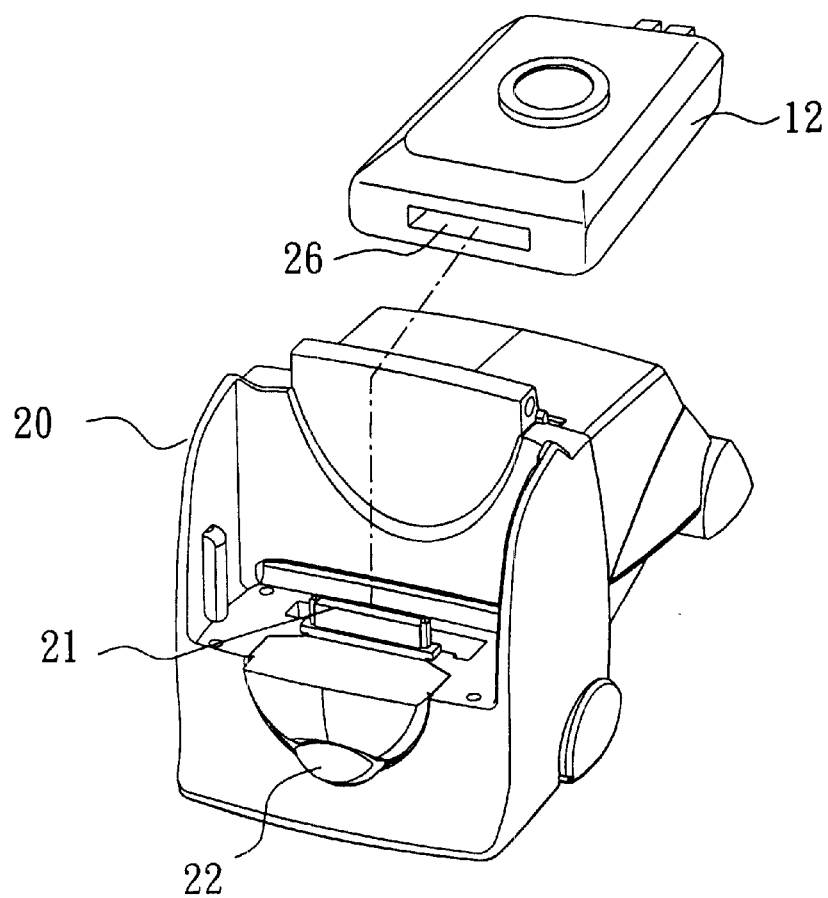
FIG. 2 is a front view of appearance of the charger of a digital camera with data transmission function in accordance with the present invention.
Figure 3:
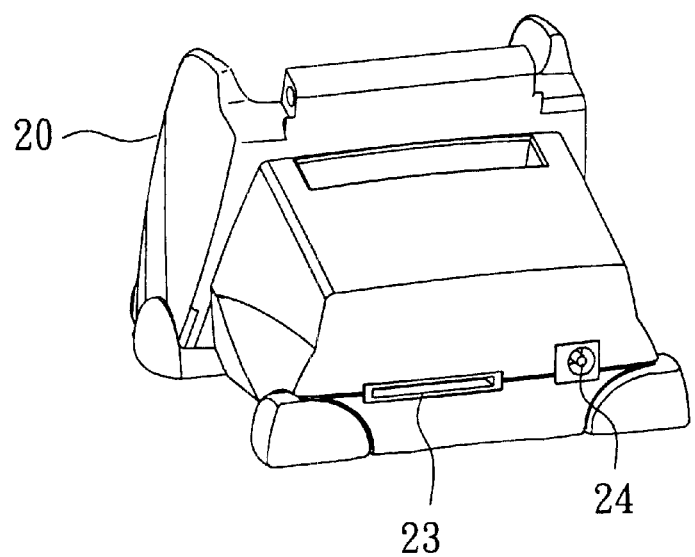
FIG. 3 is a back view of appearance of the charger of a digital camera with data transmission function in accordance with the present invention.

Please refer to FIG. 1. FIG. 1 is a system configuration diagram of a charger of a digital camera of the present invention. The charger 11 of the present invention is able to convert input power to charge a digital camera 12, and to connect to a personal computer 13 or a television 14 to transmit image and sound data stored in the digital camera 12 to the personal computer 13 or the television 14 for viewing, editing or storing. Please refer to FIG. 2 and FIG. 3. FIG. 2 is a front view of appearance of the charger of a digital camera of the present invention. FIG. 3 is a back view of appearance of the charger of a digital camera of the present invention. The body 20 of the charger has a power/signal connector 21, data transmission key 22, a computer/TV interface 23 and a power input terminal 24, etc. The power/signal connector 21 is used for being inserted with a corresponding plug 26 on the digital camera 12 so as to convert the power inputted from the power input terminal 24 into DC (direct current) power to charge or supply power to the digital camera 12. The computer/TV interface 23 is connected to the personal computer 13 or the television 14 via a standard interface. When the data transmission key 22 is pressed, data transmission between the digital camera and the computer will be executed.

Figure 4:
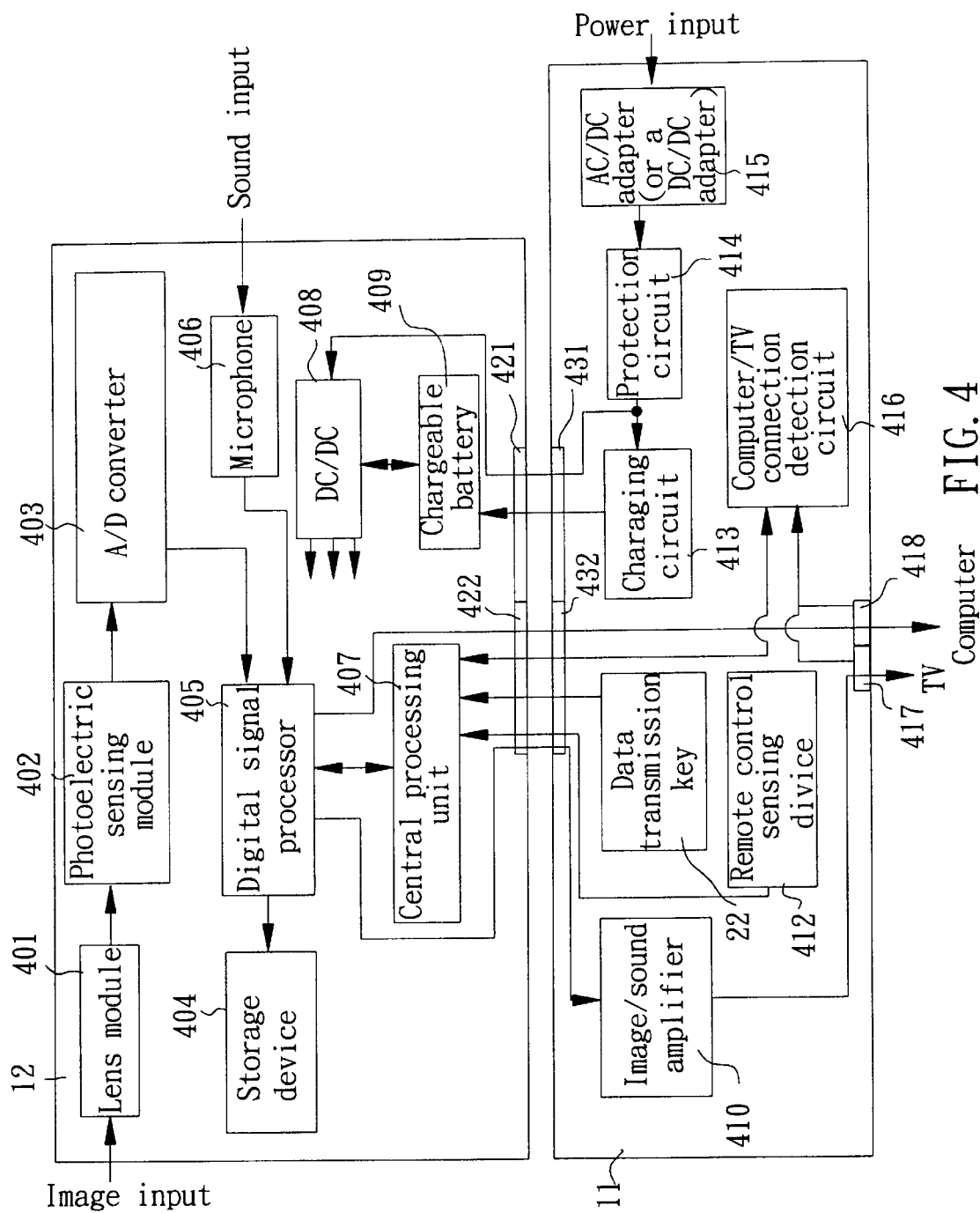
FIG. 4 is a block diagram of the charger of a digital camera with data transmission function in accordance with the present invention and a cooperated digital camera.

Please refer to FIG. 4. FIG. 4 is block diagram of the charger 11 of a digital camera of the present invention and a cooperated digital camera 12. The digital camera 12 transmits the image data to a digital signal processor 405 via a lens module 401, a photoelectric sensing module 402, and an, analog-to-digital (A/D) converter 403, so as to process and store the image data in a storage device 404, or transmits the image data to a digital signal processor 405 via a microphone 406, so as to process and store the sound data in the storage device 404. Furthermore, a central processing unit 407 of the digital camera 12 controls the operation and setup of the digital camera 12. In addition, power of all the members of the digital camera 12 are supplied by a chargeable battery 409 or an exterior direct power via a DC/DC adapter 408.

The digital camera 12 has a power contact 421 and a signal contact 422. The power contact 421 is used for connecting the chargeable battery 409 and the DC/DC adapter 408 of the digital camera 12 to the charger 11 to perform charging or power-supply operation. The signal contact 422 is used for connecting the digital signal processor 405 and the central processing unit 407 of the digital camera 12 to the charger 11 to transmit data. As shown in FIG. 2, the power contact 421 and a signal contact 422 constitute the plug 26 of the digital camera 12.

Referring to FIG. 4 again, the charger 11 has power supplying devices including an AC/DC adapter (or a DC/DC adapter) 415, a protection circuit 414 and a charging circuit 413, etc, for transforming inputted AC or DC power into a predetermined voltage to supply power to the digital camera via the power contact 431 of the charger 11. And the power contact 421 of the digital camera 12 is electrically connected to the chargeable battery 409 and the DC/DC adapter 408 of the digital camera 12 to charge or supply power to the digital camera 12.

In order to transmit data, the charger 11 has an image/sound amplifier 410, the data transmission key 22, a remote control sensing device 412, a computer/TV connection detection circuit 416, a TV connecting port 417, and a computer connecting port 418. The TV connecting port 417 and the computer connecting port 418 are used for connecting a TV or a computer, respectively. Preferably, the TV connecting port 417 is a standard A.V. (audio-visual) terminal, and the computer connecting port 418 is USB (universal serial bus) interface. The data transmission key 22, the remote control sensing device 412, and the computer/TV connection detection circuit 416 are connected to the central processing unit 407 of the digital camera 12 to control the digital camera 12 via the signal contact 432 of the charger 11 and the signal contact 422 of the digital camera 12.

The image/sound amplifier 410 is connected to the digital signal processor 405 of the digital camera 12 via the signal contact 432 of the charger 11 and the signal contact 422 of the digital camera 12, for amplifying image/sound signal from the digital camera 12 and outputting the amplified signal to the TV via the TV connecting port 417. The computer connecting port 418 is connected to the digital signal processor 15 of the digital camera 12 via the signal contact 432 of the charger 11 and the signal contact 422 of the digital camera 12, for inputting the image/sound signal from the digital camera to a computer or inputting instruction from the computer to the digital camera 12.

The TV/computer detection circuit 416 is connected to the TV connecting port 417 and the computer connecting port 418 to automatically detect if the charger 11 is connected to the TV device or to the computer. The detection circuit is also connected to the digital signal processor 15 of the digital camera 12 via the signal contact 432 of the charger 11 and the signal contact 422 of the digital camera 12 for sending a detection report to the digital camera 12. As shown in FIG. 2 and FIG. 3, the power contact 431 and the signal contact 432 constitute a power/signal connector 21 of the charger 11. The TV connecting port 417 and the computer connecting port 418 constitute a TV/computer interface 23 of the charger 11.

According to the design of the charger 11 of present invention, when power is inputted to the charger 11, if the digital camera 12 is off and positioned in the charger 11, the digital camera 12 will be turned on and be charged. If the digital camera 12 is on and positioned in the charger 11, the digital camera 12 will be charged. The charger 11 supplies power to the chargeable battery 409 of the digital camera 12, and only the central processing unit 407 of the digital camera 12 is turned on while the other members are all turned off. When the user presses the data transmission key 22, the digital camera 12 will be stopped from charging, and the other members are turned on. The central processing unit 407 of the digital camera 12 determines whether a computer or a TV is connected via the computer/TV connection detection circuit 416 of the charger 11, and performs data transmission.

When the digital camera 12 is connected to the TV, a remote control (not shown) sends a signal to the remote control sensing device 412 to forward the signal to the central processing unit 407. The central processing unit 407 controls the digital signal processor 405 to play the image/video data stored in the digital camera 12 to the TV.

When the digital camera 12 is connected to the computer, a application program in the computer will be executed to provide the user with the options of storing the image/video data, downloading data and video camera setup, etc. The user can choose one of the options to process the data transmission between the computer and the digital camera 12.

From the above-mentioned description, the charger 11 of the present invention not only provides charging function without taking out the battery, but also detects whether the charger is connected to the TV or the computer. Therefore, the digital camera can transmit data to the computer or play the image/video data on the TV, which greatly increases the convenience of the digital camera.

Although the present invention has been explained in relation to its preferred embodiment, it is to be understood that many other possible modifications and variations can be made without departing from the spirit and scope of the invention as hereinafter claimed.

What is claimed is:

1. A charger of a digital camera with data transmission function, the charger comprising:

a power supplying device for transforming inputted AC or DC power into a predetermined voltage to supply power to the digital camera via a power contact;

a charging circuit for charging a chargeable battery of the digital camera with the transformed power via the power contact;

a TV connecting port for connecting to a TV;

an image/sound amplifier for connecting to a digital signal processor of the digital camera via a signal contact, so as to amplify image/sound signal from the digital camera and output the amplified signal to the TV via the TV connecting port;

a computer connecting port for connecting to a computer, the computer connecting port connecting to the digital signal processor of the digital camera via the signal contact, so as to input the image/sound signal from the digital camera to the computer or input instructions from the computer to the digital camera;

a computer/TV connection detection circuit connected to the TV connecting port and the computer connecting port for automatically detecting whether the charger is connected to a TV or a computer, and for connecting to the digital signal processor of the digital camera via the signal contact, so as to send a detection report to the digital camera; and a data transmission key for connecting to a central processing unit of the digital camera via the signal contact, and when the data transmission key is pressed, data transmission between the digital camera and the computer or TV being executed.

2. The charger as claimed in claim 1, wherein the TV connecting port is a standard A.V. (audio-visual) terminal.

3. The charger as claimed in claim 1, wherein the computer connecting port is USB (universal serial bus) interface.

4. The charger as claimed in claim 1, wherein the power contact and the signal contact constitute a connector of the charger.

5. The charger as claimed in claim 4, wherein the digital camera has a power contact and a signal contact corresponding to the connector of the charger.

6. The charger as claimed in claim 1, further comprising a remote control sensing device connected to a central processing unit of the digital camera via the signal contact, for receiving signals from a remote control to control the digital camera control.

* * * * *